April 28, 1964     O. SCHUELLER     3,130,413
RADIATION CONTROL SYSTEM FOR SPACE SUITS AND CAPSULES
Filed July 27, 1962     6 Sheets-Sheet 1

Fig-1

INVENTOR.
OTTO SCHUELLER
BY
ATTORNEYS

April 28, 1964     O. SCHUELLER     3,130,413
RADIATION CONTROL SYSTEM FOR SPACE SUITS AND CAPSULES
Filed July 27, 1962     6 Sheets-Sheet 3

INVENTOR.
OTTO SCHUELLER

INVENTOR.
OTTO SCHUELLER
BY
ATTORNEYS

April 28, 1964         O. SCHUELLER         3,130,413
RADIATION CONTROL SYSTEM FOR SPACE SUITS AND CAPSULES
Filed July 27, 1962                         6 Sheets-Sheet 5

INVENTOR.
OTTO SCHUELLER
BY
ATTORNEYS

April 28, 1964 O. SCHUELLER 3,130,413
RADIATION CONTROL SYSTEM FOR SPACE SUITS AND CAPSULES
Filed July 27, 1962 6 Sheets-Sheet 6

INVENTOR.
OTTO SCHUELLER
BY
ATTORNEYS

United States Patent Office 3,130,413
Patented Apr. 28, 1964

3,130,413
RADIATION CONTROL SYSTEM FOR SPACE
SUITS AND CAPSULES
Otto Schueller, Dayton, Ohio, assignor to the United States of America as represented by the Secretary of the Air Force
Filed July 27, 1962, Ser. No. 213,069
11 Claims. (Cl. 2—1)
(Granted under Title 35, U.S. Code (1952), sec. 266)

The invention described herein may be manufactured and used by or for the United States Government for governmental purposes without payment to me of any royalty thereon.

This invention relates generally to personal protective equipment for use as an independent suit or garment in outer space and, more particularly to a space capsule or suit constituting an improvement over the "Multi-Purpose Space Capsule," described and claimed in my copending patent application, Patent 3,073,040, dated January 15, 1963, filed March 20, 1961, and also an improvement over my copending patent application, Serial No. 103,664, filed April 17, 1961, for "Moon Capsule Suit," having for an object, temperature control systems for space suits and capsules for earth orbital, lunar, and planetary missions, and its utilization as a protective flexible radiation shield against ionizing radiation and meteorites.

A further object is the provision of outer adjustable radiation protective means for a space suit or capsule for use in outer space, or in a substantial vacuum such as on the moon, for utilizing radiative heat exchange whereby a substantial reduction, or even elimination, of otherwise required expandable coolant for heat control of the interior of the suit or capsule and its occupant is accomplished.

A further object is the provision of a space capsule or suit having adjustable overlapping infrared radiation reflector shield means hingedly disposed on the exterior of the suit or capsule in outwardly spaced relation for separation, and overlapping contacting relation between different positions, inclining upwardly and outwardly away from the suit or capsule to reflect the heat or albedo from the exterior supporting environment, away from the exterior of the suit or capsule during a lunar day, while permitting heat and radiation from within the capsule or suit to escape in an upward and outward direction between the radiation reflector shield means together with solar heat radiated from the outer reflecting coating of the suit in which said reflector shield means are further inclined into closed overlapping contact relation to form an inwardly directed radiation reflecting means for reflecting heat radiated from the occupant and interior of the suit or capsule inwardly, to prevent a material heat loss from within the suit or capsule during a lunar night.

A further object is the provision of a space suit or capsule having an outer surface coating which is highly emissive for long wave, infrared radiation and at the same time highly reflective for direct solar radiation for reflecting about 80% of direct solar radiation but behaving in regard to long wave infrared radiation almost like a black body with an emissivity of approximately 95%, in combination with an outer protective adjustable flexible shielding structure spaced outwardly from said coating comprising a multitude of individual overlapping, rigid, highly polished reflector plates, each hinged horizontally adjacent one edge for exposing said coating to permit the long wave infrared radiation from within the suit or capsule and occupant to escape between the reflector plates while simultaneously reflecting a major portion of infrared-albedo radiation striking said reflecting surfaces thereof in a direction outwardly away from said space suit or capsule and including means for tilting said reflectors upwardly into overlapping contacting relation, and lowering said reflectors to outwardly and upwardly inclined spaced relation to each other.

A further object includes means for automatically raising and lowering the reflectors between said positions.

A further object includes means disposed within the suit or capsule for raising the reflectors to upwardly and outwardly inclined overlapping contacting relation, and lowered upwardly and outwardly spaced relations to each other.

A further object includes thermostatic means connected to the reflectors for adjustments thereof, relative to predetermined temperatures exterior of the coating, between the aforesaid upwardly and outwardly inclined spaced relations and the upwardly and outwardly inclined overlapping contact relations.

A further object includes an outer space environmental suit or capsule adapted to enclose an occupant therein having the walls thereof composed of layers of material having high and low atomic numbers (Z-numbers) arranged alternatively to reduce the "bremsstrahlung" effect, including adjustable horizontally pivoted radiative shield members spaced outwardly therefrom in overlapping relation to enclose and selectively protect the suit or capsule from exterior radiation from the albedo of the surrounding environment in or on which the suit or capsule and occupant therein are located.

A further object includes the provision of a space suit or outer space environmental capsule having an outer surface coating thereon for reflecting about 80% of direct solar radiation striking the outer surface thereof and is emissive to long wave infrared radiation from the interior of the suit or capsule and occupant while working in extremely low temperatures in the substantial vacuum of outer space environment, and the inclusion of an outer flexible scale-like radiation reflective armor composed of overlapping disk-like protective plates, each hinged at its upper edge portion in outwardly spaced relation to the exterior of the suit or capsule, including cable means for raising the free edges of the disks from an upwardly inclined spaced relation to an upwardly and outwardly inclined contacting relation, in which said plates have highly reflective surfaces on both of the front and rear faces thereof for reflecting infrared radiation therefrom, including means for opening and closing said plates in predetermined relation to temperatures between the exterior of the suit or capsule and the interior confines of the scale-like flexible reflective, protective armor.

A further object includes an outer space environmental protective suit or capsule as set forth above, in which highly reflective overlapping horizontally pivoted adjustable plates are outwardly spaced in heat insulated relation to the exterior of the suit or capsule and disposed in individual overlapping vertical rows, and include gravity operated means for selectively opening and closing the plates in predetermined rows in predetermined relation to the inclination of the space suit or capsule relative to a vertical reference position.

Other objects and advantages of the invention will become apparent from the following description and accompanying drawings in which like reference characters refer to like parts in the several figures.

FIGURES 4 and 5 are fragmentary detail sectional views of a slight modification, in which two sets of protective radiation reflective shield members are employed, one spaced next to the outer surface of the capsule or pressure suit and the other spaced farther outwardly, FIGURE 4 showing the reflectors opened to their outwardly and upwardly inclined spaced relations while FIGURE 5 illustrates the same closed to their overlapping contacting relations.

FIGURE 9 schematically illustrates two encircling manipulating networks for the scale armor type shown in FIGURES 6, 7 and 8, illustrating the upper and lower concentric frames or hooks to which the upper and lower edge portions of the disks or scales are connected by cables 47 and 48 for tilting displacements upon vertical relative displacement of the hoops 54a and 55a.

As explained in my copending patent applications previously referred to, a space capsule or suit for use in outer space environments such as on the moon or nearby planets, beside providing a relatively mobile space suit or capsule and/or garment which incorporates both the necessary life supporting properties and facilitates ease of movement as well to enable the space man to move around in the environment of outer space and perform useful work with relative ease and comfort for prolonged periods, must provide for protection against radiation from the sun, for instance during a lunar day (lasting approximately fourteen earth days) when the temperature at the surface of, for instance, the moon is heated to about 243° F. as well as during a lunar night (of fourteen earth days) when the temperature at the surface of the moon approaches approximately −275° F., a differential of temperature of approximately 518° F., and in a substantially vacuum environment. In addition, the temperature control environment within the suit or capsule must be kept within relatively narrow limits and without the expenditure of a material amount of evaporation of a coolant liquid such as water, and in addition the interior of the suit or capsule must be protective against excessive direct solar and ionized radiation, and from contact with small high velocity meteorites, etc.

Figure 1:
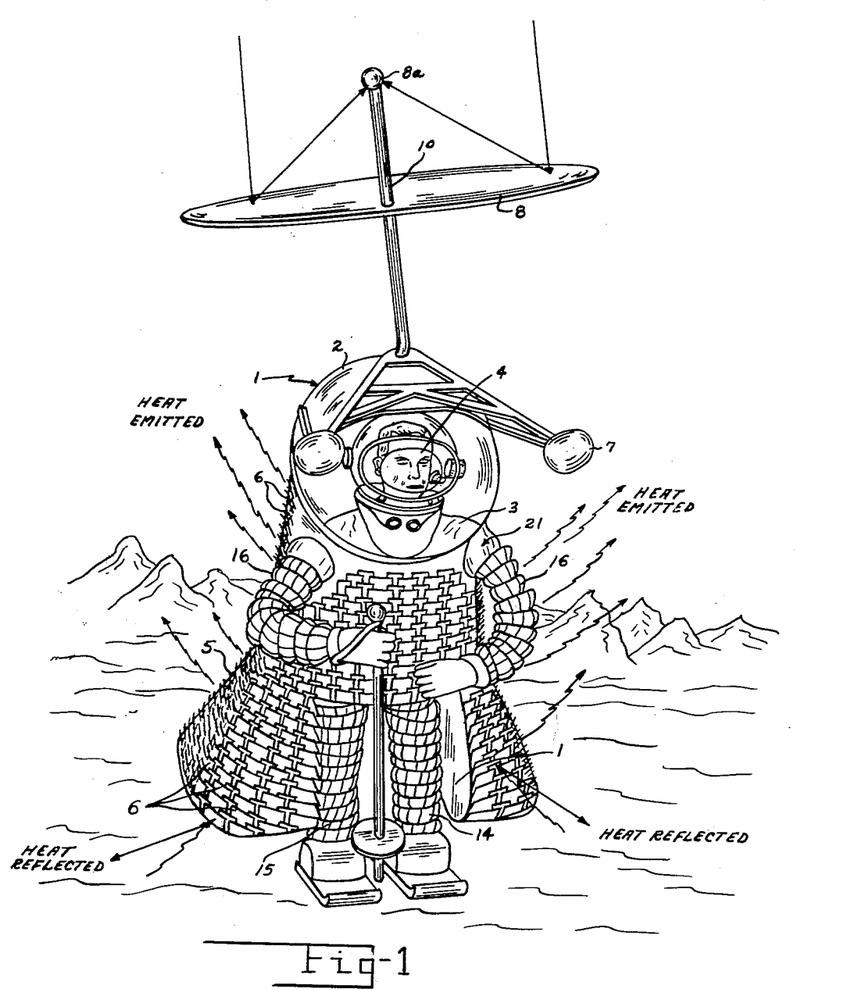
FIGURE 1 is a somewhat schematic view of a moon capsule or space suit, similar to that disclosed in the drawings of my copending patent application for "Moon Capsule Suit," Serial Number 103,664, filed April 17, 1961, having my invention incorporated therein.

Referring to FIGURE 1, the reference numeral 1 denotes a moon capsule or suit generally as including an outer pressurized capsule 2 and an inner emergency mechanical pressure suit 3 in which is enclosed a prospective space man, indicated at 4, and the outer capsule 1 includes a door or other openable access opening (not shown).

Spaced outwardly from the exterior of the capsule or suit 1 is an outer infrared radiation and meteorite protective shield indicated generally at 5, shown in detail in the drawings, composed of overlapping vertical rows of highly polished relatively thin infrared radiation reflective plates or shields 6 which are pivoted adjacent their lower edges for adjustment between an upwardly and outwardly inclined contacting position and an upwardly and outwardly inclined spaced overlapping positions (shown in FIGURE 1) for emitting heat radiated from the interior of the capsule or suit as well as reflecting solar radiation outwardly away from the outer coating of the suit or capsule 1 in an upward direction toward outer space while at the same time reflecting radiation or albedo from the supporting and surrounding environment downwardly and outwardly away from the suit or capsule 1, as schematically indicated by legends and arrows in FIGURE 1.

The numeral 7 denotes an elongated upper support or resting element which is rigidly attached to the helmet portion of the suit or capsule 2, also a solar or "sunpower" energizing umbrella is indicated generally at 8, which may be pivotally attached to the top of the space suit or capsule 2 for adjustment, for concentrating the solar rays on a focal power energizing element 9 carried on a post or support 10, which may act as a communicating antenna.

The concave solar power concentrating shield or umbrella 8 may function as an additional solar radiation shield for the suit or capsule 2, during a solar day.

The pressurized suit or capsule 2 is provided with flexible leg enclosing extensions 14 and 15 to accommodate the legs of the occupant and provide upright support for the space suit or capsule, the lower part of the body of the suit or capsule 2 having flared extremities recessed to provide space for movement of the leg members 14, 15.

The body of the suit or capsule 2 is also provided with articulated arm receiving extensions 16, substantially as contemplated in my previously referred to copending patent applications but provided with the radiation shields or plates 6 of the present invention. The interior of the suit or capsule 2 is, of course, provided with the necessary seating means for the occupant, as well as means providing storage for food, drink, etc., as previously contemplated in my copending referred to patent application.

Figure 2:
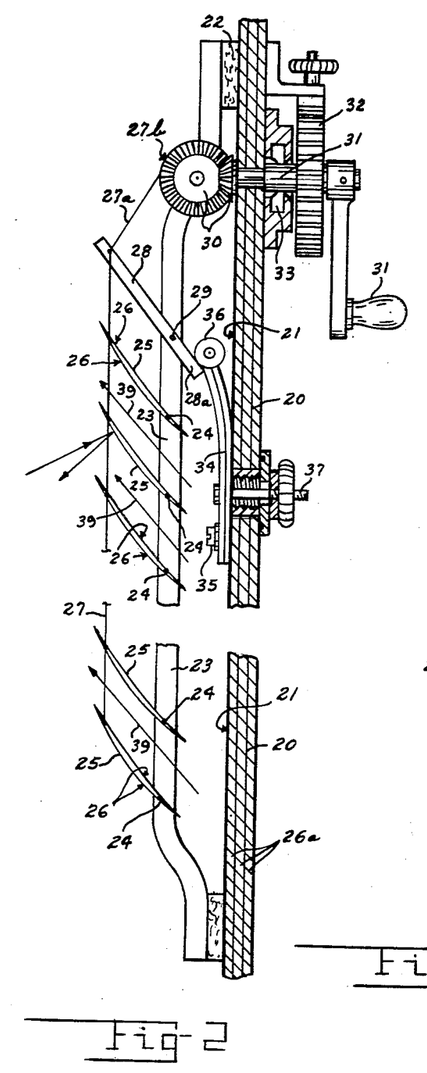
FIGURE 2 is an enlarged fragmentary detail vertical sectional view through the wall of the suit or capsule, disclosing one vertical row of the overlapping radiation protective reflector elements, showing the same in spaced or open upwardly and outwardly inclined condition, such as during a solar day in an outer space environmental condition, such as on the moon.
Figure 3:
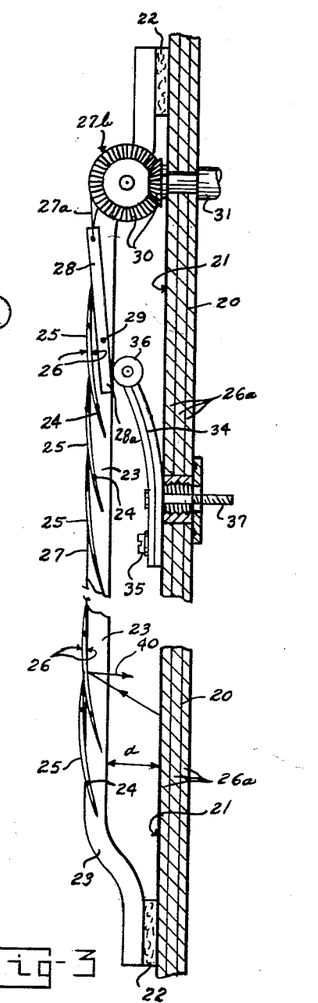
FIGURE 3 is a similar sectional view, illustrating the overlapping protective radiation reflective elements in upwardly and outwardly inclined closed contacting relation, such as during a lunar night, or in the shade in an outer space environmental condition.

Referring now to FIGURES 2 and 3, the reference numeral 20 indicates a portion of a pressurized space suit or capsule such as indicated at 2, having an outer white coating 21 which will emit heat or infrared from within the capsule or suit to the heat sink of outer vacuum space, in other words, highly emissive for long wave infrared but at the same time highly reflective for direct solar radiation. For example, a white paint which could be employed as a suitable coating 21 is a silicon alkyd, pigmented with rutile which reflects about 80% of the direct solar radiation but which behaves, in regard to long wave infrared, almost like a black body with an emissivity of about 95%.

Fixed to the exterior surface of the capsule or suit 2 and insulated therefrom by thermal insulating means 22 are vertically disposed transversely spaced elongated supporting bars or members 23 which are outwardly spaced from the exterior of the capsule or suit 2. On these bar members 23 are horizontally pivoted at 24, adjacent their lower ends, a multitude of comparatively short adjustable overlapping rectangular radiation shields or plate members 25 which are adjustable between upwardly and outwardly inclined spaced overlapping relations, as shown in FIGURE 2, and greater inclined overlapping contacting or closed relation, as shown in FIGURE 3.

The overlapping short rectangular radiation shields or plate members 25 are highly reflective on both faces for long wave infrared light, being preferably made of light metals, or metal coated, e.g., gold coated plastics, the coatings being indicated at 26.

The shields or plates 25, in combination with the surface coating 21 and the walls, and material 26a of the capsules or suits may also be used as a shield against meteorites and ionizing radiation, and for this latter purpose, layers of materials with low and high atomic numbers (Z-numbers) are arranged alternately for reducing the "bremsstrahlung" effect, for instance, paraffin and lead layers.

Automatic and manual actuating means are employed for opening and closing the overlapping rows of shields or blinds 25. The outer end portions of the blinds or shields 25 in each row (or several rows) are connected together by flexible connectors or cables 27, the cables being connected to the outer ends of actuating levers 28 which are pivoted at 29 to the supporting members or bars 23. The actuating connectors or cable members 27 extend upwardly beyond the levers 28, as indicated at 27a and are wound on cable drums 27b which are operable by suitable gearing 30 from within the suit or capsule 2 by crank means 31, and by a suitable bimetallic spiral thermostat means 32 located within the capsule to thus control the closing of the shield member 25 automatically, or manually from within the suit or capsule 2, sealing means 33 being provided to eliminate pressure leakage from the interior of the suit or capsule 2.

Means are also provided for automatic adjustment of the blinds relative to the temperature between the blinds 25 and the exterior of the space capsule comprising bimetallic thermostat members 34 each having one end fixed relative to the suit or capsule at 35 and having a roller 36 at its free end engaging the extension 28a of one of the levers 28 as seen in FIGURES 2 and 3, including adjustment means 37 for determining the temperature setting.

From the above, it will be observed that the shields 25 may be closed or opened by manipulation of the crank means 31 by a prospective space man within the suit or capsule 2, also the blinds 25 may be made capable of automatic actuation by adjustable thermostat control means if desired according to the average temperature within the suit or capsule, and in addition the rows of blinds 25 are selectively controlled by the exterior thermostat means 34 according to the relative temperature exterior of the suit or capsule as determined by the solar radiation and outside temperature adjacent the outer surface of the space suit or capsule 2.

In FIGURE 2 the arrows 38 indicate how the albedo radiation during a solar day is reflected outwardly and downwardly away from the shield of the capsule suit, in addition to the reflection from the outer coating 21, while the internal heat generated within the suit or capsule and by the space man is radiated upwardly and outwardly toward the sky, as indicated by the arrows 39, when the space man is working on the surface of the moon, or a nearby planet, during a solar day.

In FIGURE 3 the radiation reflective shields 25 are shown closed, as during a lunar night, when the inner reflective surfaces are disposed for reflecting the heat radiated from within the suit or capsule back toward the suit or capsule suit, as indicated by the arrows 40, to prevent the excessive escape of heat from the interior of the suit or capsule into the surrounding cold environment, such as in the shade or during a lunar night.

Figure 4:
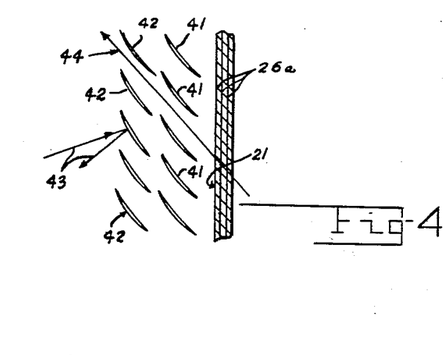
Figure 5:
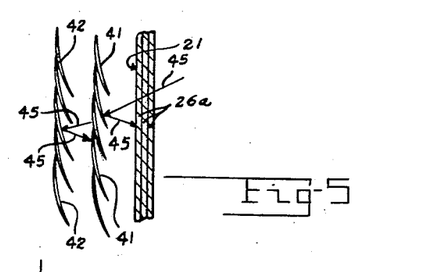

FIGURES 4 and 5 illustrate a modified form incorporating two concentric sets of adjustable exterior infrared radiation shield members of the type indicated at 25 in FIGURES 2 and 3, comprising an inner set of overlapping rows, of upwardly and outwardly inclined overlapping individual radiation shield members indicated at 41 and outwardly spaced set of upwardly and outwardly inclined similar plates indicated at 42, both of the inner and outer faces thereof being highly polished for reflection of infrared.

In FIGURE 4 the reflector elements 41 and 42 are shown open, wherein the arrows 43 indicate the direction of albedo radiation and reflection during the solar day, which is reflected outwardly and downwardly, while the internal radiation from the suit and occupant is allowed to escape outwardly and upwardly between the shields 41 and 42, indicated at 44, into the surrounding vacuum environment.

In FIGURE 5 the shields or blinds 41 and 42 are shown closed, as during a lunar night, and radiation escaping from the interior of the capsule or suit is reflected and radiated back to the capsule or suit as indicated by the arrows 45, the supporting and adjustment controls for the blinds 41 and 42 being omitted as the same may be similar to the supporting and adjustment control instrumentalities shown in FIGURES 2 and 3.

In FIGURES 4 and 5 a portion of the wall of the pressurized space capsule or suit is indicated at 26a having an outer wall composed of layers with high and low atomic (Z-numbers) arranged alternately to reduce "bremsstrahlung" effect, as well as coated at 21, as before described, for reflecting approximately 80% of direct solar radiation with an emissivity of infrared of about 95%.

Figure 8:
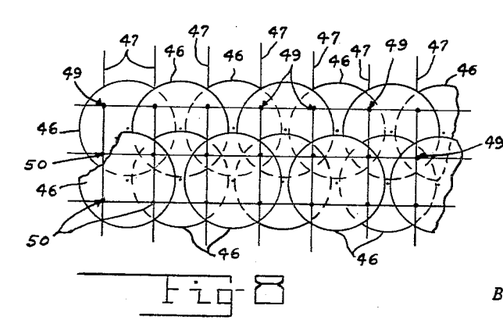
FIGURE 8 is a fragmentary detail elevation view of a portion of the protective scale armor type structure contemplated in FIGURES 6 and 7.
Figure 9:
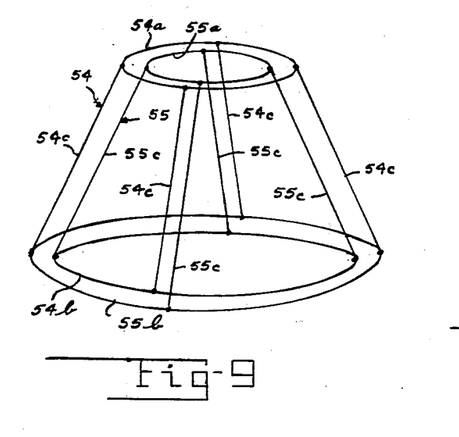
Figure 10:
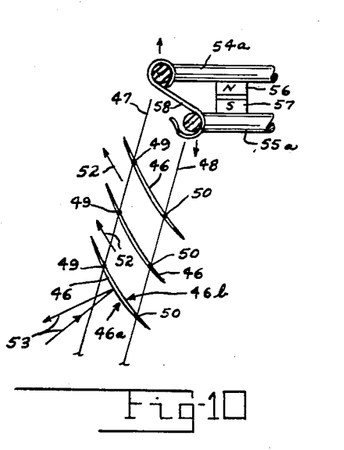
FIGURES 10 and 11 are fragmentary detail sectional views of the manipulating or tilting means for the plates disclosed in FIGURES 6, 7 and 8, employing magnetic and hook means for retaining the upper rings or hoop members in juxtaposed relation to retain the plates in open position (as seen in FIGURE 10) or permitting release thereof for closing (as seen in FIGURE 11).

FIGURES, 6, 8, 9, 10 and 11 illustrate a further embodiment in which the outer radiation shield structure is in the form of an outwardly and downwardly flared or truncated conical structure incorporating the individual overlapping rows of overlapping tiltably adjustable radiation reflective shields 46 which are circular disks disposed in overlapping vertical rows, as shown in FIGURE 8 and supported on flexible outer and inner pairs of cables, or the like, indicated at 47 and 48, in FIGURE 10, the outer cables 47 passing through horizontally spaced upper apertures 49 adjacent the upper edges of the plates and secured thereto at these apertures 49 as shown. The inner supporting flexible cables (or wires) 48 pass through horizontally spaced lower apertures 50 adjacent the bottom edges of the disks or shields 46 and connected thereto at 50, thus providing flexible means for suspending the plates in connected overlapping relation, preventing both vertical and horizontal bodily displacement.

Figure 6:
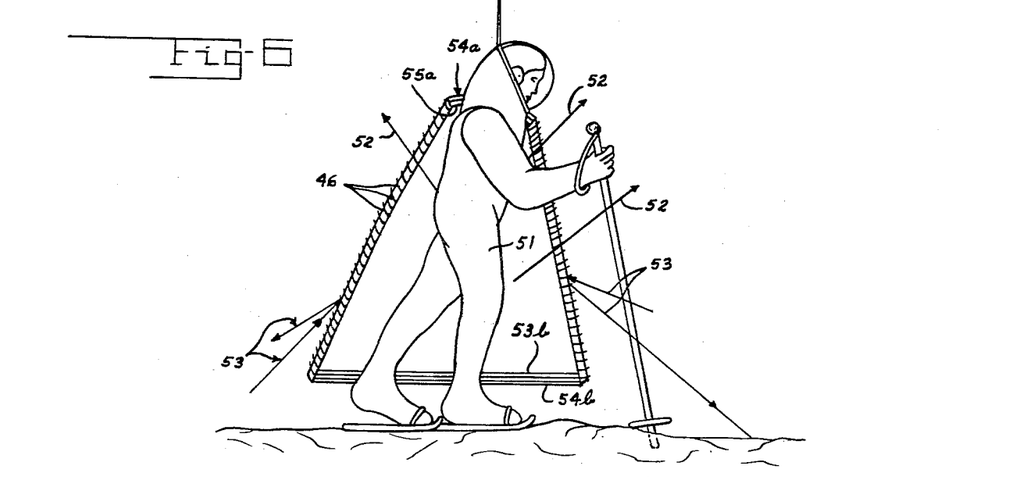
FIGURES 6 and 7 are diagrammatic sectional views showing the application of the principle of the invention to a space suit coverall, and directly (in FIGURE 7) to an anthropomorphic space suit, incorporating a scale armor type infrared radiation protective structure.

The plates 46 may also be made rectangular, or oval, however, the outer and inner faces 46a and 46b are highly polished and highly reflective to infrared radiation and are inclined upwardly and outwardly in spaced relation to each other when in open position, as illustrated in FIGURE 10, to permit radiation and heat from the occupant 51, as seen in FIGURE 6, to escape between the spaced plates during a solar day, indicated by the arrows 52, while radiation or albedo from the surface and surrounding environment on which the occupant 51 is working (or walking) as indicated by the arrows 53 is reflected outwardly and downwardly away from the occupant. The space suit or capsule of the space man 51 must, of course, be provided with an outer solar radiation reflective coating like the coating 21, as contemplated in connection with the space suit or capsule 1, to reflect the solar radiation from the sun which passes between the plates 46, and strikes the outer surface of the suit during a solar day.

Figure 11:
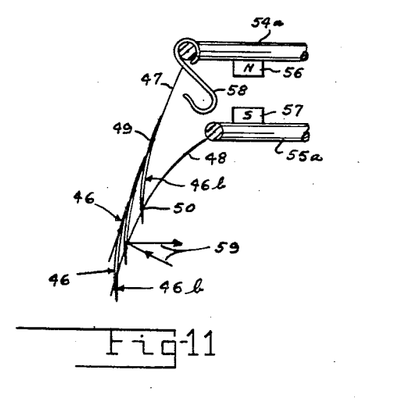
Figure 12:
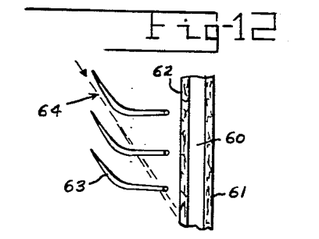
FIGURES 12, 14, 16 and 18 are fragmentary detail sectional views of modified forms of radiation reflective plates, associated with the outer surface of a space suit or capsule showing the same in open position.
Figure 13:
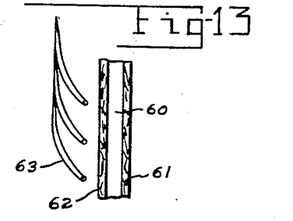
FIGURES 13, 15, 17 and 19 are similar views showing the modifications shown in FIGURES 12, 14, 16 and 18 in closed overlapping contacting relation.
Figure 14:
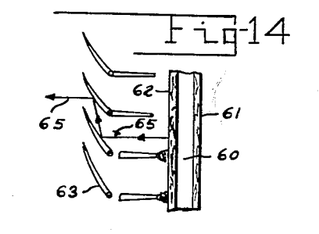
Figure 15:
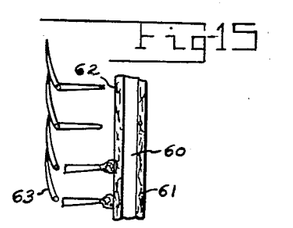

Any suitable means may be provided for manipulating the connecting cables 47 relative to the cables 48, such as shown in FIGURES 9, 10 and 11, in which a pair of concentric outer and inner frames 54 and 55 are provided comprising upper hoop members 54a and 55a, and lower hoop members 54b and 55b connected together by stiff spacer members 54c and 55c with the opposite ends of the cables 47 connected to the hoops 54a and 54b and the opposite ends of the cables 48 connected to the inner, upper and lower hoops 55a and 55b.

The radiation reflective disks 46 may be held in open position, as seen in FIGURE 10, by suitable magnets 56 and 57 disposed on the adjacent sides of the upper hoops 54a and 55a, means being provided for locking the plates 46 in their open positions may include hook members 58. By unhooking the hooks 58 and separating the upper hoops (by vertical displacement and separation of the magnets 56 and 57) the inner frame 55 can be displaced downwardly (as seen in FIGURE 11), for instance by gravity, to bring the disks 46 into overlapping contacting closed positions as shown wherein heat and infrared radiation escaping from within the space suit (and occupant) is reflected by the highly polished surfaces 46b back toward the occupant, such as during a lunar night, as before explained, as indicated by the arrows 59. The disks 46 may be slightly "dished" or concave as shown to increase individual rigidity thereof.

Figure 7:
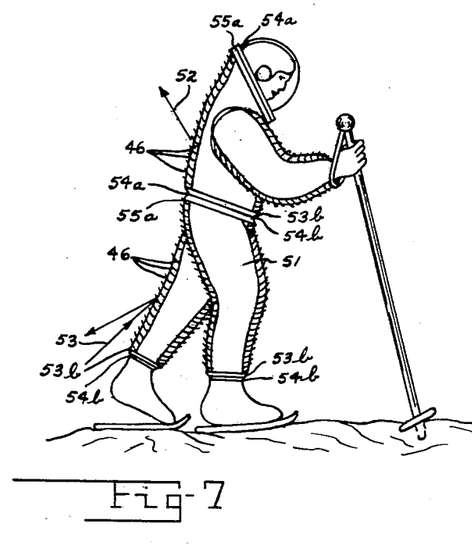

In FIGURE 6, the outer flexible radiation shield, the details of which are shown and described above, is in the form of a sort of cape and in FIGURE 7 it comprises an upper and lower garment approach, such as a two-piece protective outer garment located more closely adjacent the exterior surface of the space suit or capsule 51.

A further modification is illustrated in FIGURES 12 to 19 in which a sectional portion of the space suit or capsule is shown at 60 comprising layers 61 and 62 of material having high and low atomic numbers (Z-numbers) arranged alternately to reduce "bremsstrahlung" effect, the shields or blinds 63 being bent or combined at different angles to prevent direct hits on the capsule or pressurized suit by charged particle radiations or meteorites as indicated by the dotted lines 64, but still permits the escape of heat from the interior of the suit or capsule between the highly infrared, radiation reflective surfaces of the shield as indicated by the arrows at 65.

Figure 16:
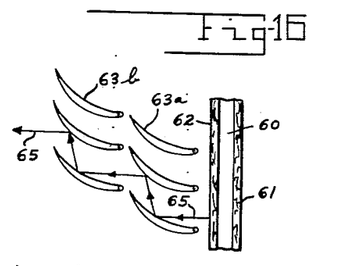
Figure 17:
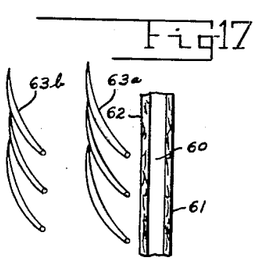
Figure 18:
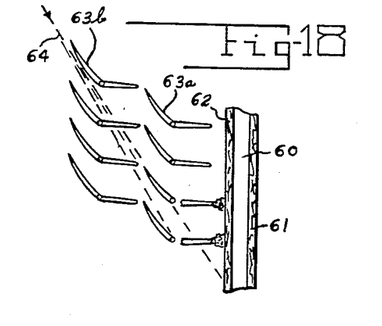
Figure 19:
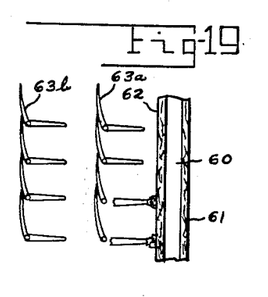

FIGURES 16 to 19 illustrate inner and outer sets of bent or "angle formed" radiation reflective shields 63a and 63b, FIGURES 16 and 18, showing the blinds open, upwardly and outwardly inclined, while FIGURES 17 and 18 show the same moved to increased upwardly inclined and contacting relation for reflecting the infrared or heat escaping from the suit or capsule back toward the suit or capsule, as during a lunar night, to prevent excessive cooling of the environment within the suit or capsule.

Figures 20, 21:
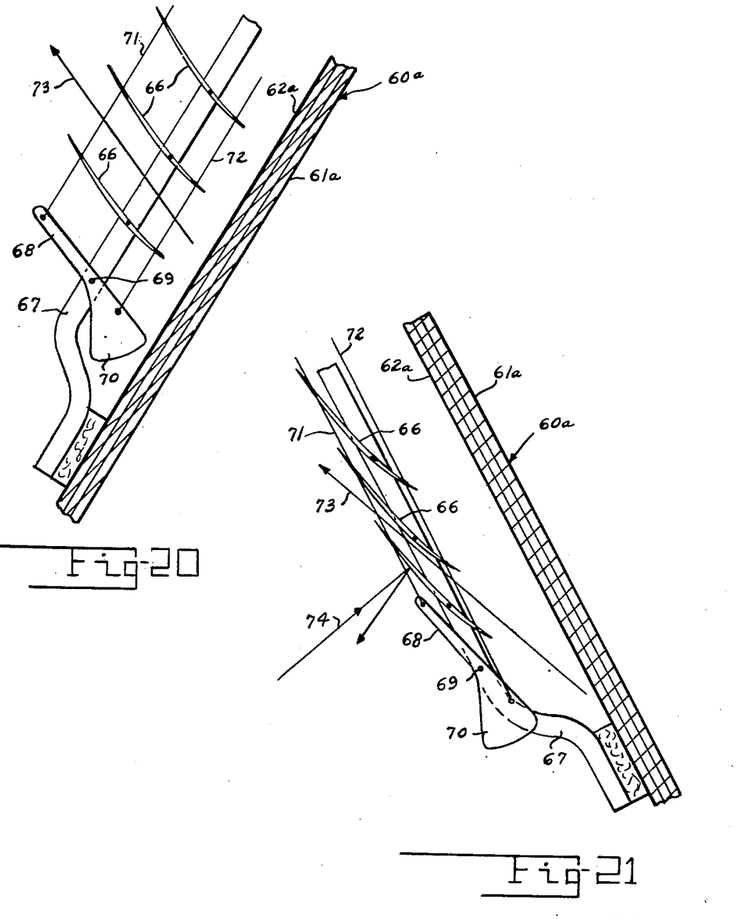
FIGURES 20 and 21 are fragmentary vertical sectional views showing a portion of a space suit or capsule and its insulated outwardly spaced infrared radiation reflective overlapping plate elements with means for opening and closing the same by gravity according to the inclination of the adjacent surface of the space suit or capsule from a vertical reference position.

FIGURES 20 and 21 are fragmentary detail sectional views of a modification of the operating means for actuating the shields when pivoted to vertical supports such as shown at 23 in FIGURES 2 and 3. The shields are indicated at 66, being pivoted intermediate their edges to the vertical support bars 67 in overlapping outwardly and upwardly inclined relation. A gravity operated lever 68 is provided for each row or group of shields 66 which is pivoted to the support bar 67 below the shields as at 69, having a weighted end 70. Two operating cables or connectors 71 and 72 are connected to the lever 68 and to the ends of the shields 66 at opposite sides of their pivots as shown for maintaining the lever and shields in parallel relation during angular adjustments of the gravity operated lever 68, as seen in FIGURES 20 and 21, from the open position shown in FIGURE 20 toward closed position shown in FIGURE 21, thus providing automatic actuation of the shields 66 depending upon the angular relation of the outer surface of the space suit or capsule 60a relative to a vertical reference.

Assuming that the space man is bending over and exposing his back to the sun the albedo will be reflected by the outer or lower surfaces of the shields or plates 66 upwardly away from the outer surface of the shield structure, and the weights 70 will hold the shields open so that heat radiated from the interior of the space suit or capsule can escape along with the solar radiation reflected by the coating or layer 62 outwardly and upwardly as indicated by the arrow 73. Upon inclination of the surface of the capsule or suit, as seen in FIGURE 21, the weights 70 will close the shields toward or to overlapping contacting relation to reduce or prevent the escape of radiation from the suit or capsule while preventing infrared radiation, as indicated by the arrow 74, from reaching the space man in the capsule or suit. For instance, when the space man is reclining and at rest during a lunar night, the shields will be closed by gravity because of the weighted levers in the portions of the space suit or capsule facing downwardly. When the space man is bending forwardly the radiation shields exposed to the supporting surface on which he is working will be closed.

I claim:

1. An outer space environmental suit adapted to enclose a prospective space man for use in outer space and on the moon and nearby planets, an outer solar radiation reflective coating thereon for reflecting solar radiation therefrom having an emissivity for long wave infrared radiation from the interior of the suit and a space man when enclosed therein, and an outer adjustable infrared radiation shield enclosure carried by the suit in outwardly spaced relation to said coating comprising a plurality of overlapping vertical rows of overlapping radiation shield members horizontally pivoted for vertical tilting displacement between upwardly and outwardly inclined overlapping spaced relation and upwardly and outwardly inclined overlapping contacting relation, said shield members having inner and outer highly polished infrared radiation reflective faces facing respectively inwardly toward said coating and outwardly away from said coating.

2. A space suit adapted to receive and sustain a space man in an outer space environment on the moon or nearby plants comprising an enclosure for the space man having an outer coating for reflecting a major portion of solar radiation and emissive for a major portion of infrared radiation from the interior of the suit, a flexible radiation shield carried by said suit in outwardly spaced relation thereto, comprising a multitude of individual overlapping infrared radiation reflective shield members pivoted substantially horizontally for tilting adjustments between an outwardly and upwardly inclined overlapping spaced relation to each other to admit direct solar radiation therebetween and allow infrared radiation from within to escape therebetween, and greater upwardly inclined overlapping contacting relation to close the spaces between the shield members to prevent the escape of infrared radiation from within, said shield members having inner and outer highly polished faces for reflecting infrared radiation striking the outer surfaces outwardly and downwardly, and reflecting infrared radiation escaping from within the suit back toward the suit when the shield members are disposed in said upwardly and outwardly inclined closed overlapping contacting relation.

3. An outer space suit, comprising, an exterior shielding enclosure carried thereby comprising, a multitude of individual overlapping upwardly and outwardly inclined radiation reflective shield members disposed in overlapping rows, pivoted for swinging adjustment from upwardly and outwardly inclined overlapping spaced relation to each other to increased upwardly inclined contacting overlapping relation, means for tiltably supporting the shield members in outwardly spaced enclosing relation to the exterior of an outer space suit, said radiation reflective shield members having outer and inner faces adapted to face respectively, outwardly and downwardly away from the space suit and inwardly and upwardly toward the exterior surface of a space suit, and means for automatically adjusting the inclination of the shield members between said outwardly and upwardly inclined overlapping spaced and contacting relations, in predetermined relation to temperature within the confines of said shielding enclosure.

4. In combination, an outer space suit for use in outer space environments such as on the moon and nearby planets having an outer radiation reflective surface coating emissive to long wave infrared radiation from within the suit and highly reflective to solar radiation striking the coating from the exterior of the suit, an outer flexible infrared radiation reflective shield carried by said suit enclosing said space suit in outwardly spaced relation thereto comprising a plurality of vertical support bar members fixed on the exterior of the suit in transversely outwardly spaced substantially parallel relation on exterior of said space suit in thermally insulated relation thereto, substantially flat highly polished infrared radiation reflective individual shield members horizontally pivoted to said vertical support bar members in vertically spaced overlapping outwardly inclined relation to each other for limited tilting movement between upwardly and outwardly inclined spaced substantially parallel overlapping relation, and greater inclined contacting overlapping closed relation, and means on said bar members for adjusting the inclination of said shield members between said spaced relation and said closed contacting relation.

5. In an outer space environmental suit for use in outer space and on the moon and nearby planets, comprising an inner pressurized suit adapted to receive and sustain an occupant therein having an outer wall composed of superimposed layers of material having high and low atomic numbers (Z-numbers) arranged alternately to reduce the "bremsstrahlung" effect and an outer surface coating which is highly reflective to solar radiation and highly emissive for long wave infrared radiation, and an outwardly spaced flexible enclosing infrared radiation shield carried by the exterior of the outer wall comprising relatively small individual highly infrared radiation reflector members disposed in upwardly and outwardly inclined spaced overlapping relation for reflecting infrared radiation directed upwardly and inwardly toward the suit, in a direction outwardly and downwardly away from the suit, and permitting infrared radiation emitted from the interior of the suit to escape upwardly and outwardly away from the suit between the spaced radiation reflector members.

6. An outer space environmental suit for use in outer space and on the surface of the moon and nearby planets as set forth in claim 5 in which said highly infrared radiation reflector members are disposed in overlapping rows and tiltably supported in outwardly spaced overlapping insulated relation to the exterior of said wall of said pressurized suit for inclined pivotal adjustments from said overlapping upwardly and outwardly inclined spaced relation to an increased inclined contacting overlapping closed relation for preventing the escape of infrared radiation from the interior of said pressurized suit and reflecting the same back to the pressurized suit to prevent excessive heat loss from within the pressurized suit during a lunar night when direct solar radiation is not present.

7. Apparatus as set forth in claim 6 including manual control means within the pressurized suit, and thermostatic means between the exterior of the pressurized suit and the inner surfaces of said enclosing infrared radiation shield for adjusting the inclination of said infrared radiation reflector means in predetermined relation to temperatures within said pressurized suit and within the confines of said infrared radiation shield.

8. An outer space environmental suit adapted to sustain an occupant in outer space, and on the moon and nearby planets comprising, a pressurized inner suit having an outer solar radiation reflective coating, an enclosing flexible infrared radiation reflective protecting shield surrounding said pressurized inner suit comprising transversely spaced vertical supporting means fixed to the exterior of said pressurized suit in outwardly spaced parallel insulated relation thereto, vertical rows of spaced individual infrared radiation reflective plate members pivotally mounted in adjacent rows on said vertical supporting means in vertically spaced overlapping relation to each other and transversely spaced overlapping relation to plates in the adjacent rows, said plates each having highly infrared radiation reflective front and rear faces and inclining upwardly and outwardly away from said pressurized inner suit in substantially parallel spaced relation.

9. In a radiation control system, a space suit adapted to receive and sustain an occupant in an outer space environment such as on the moon and nearby planets and subject to infrared albedo radiation from below and a surrounding supporting environment, and to solar radiation from above, including ionizing radiation, a plurality of alternate superimposed layers on the outer wall thereof comprising materials having high and low atomic numbers (Z-numbers), an outer solar radiation reflective coating on said suit for reflecting solar radiation therefrom, which is emissive to infrared radiation from within the suit, an outer flexible infrared radiation shielding enclosure surrounding said suit in insulated outwardly spaced relation comprising, a multitude of small infrared radiation reflective shield members tiltably disposed in overlapping relation in a plurality of substantially vertical overlapping rows, the shield members in each row being tiltable to upwardly and outwardly inclined spaced open relation to provide openings therebetween to permit solar radiation to reach said outer coating of the suit for reflection thereby outwardly and upwardly, together with escape of infrared radiation emitted from within the suit, during a solar day, flexible means for simultaneously moving said shield members in each row to an increased upwardly inclined overlapping, contacting closed relation, for reflecting infrared radiation emitted from the suit back toward the suit to prevent excessive escape of heat from within the suit, during a lunar night, said shield members each comprising a substantially flat relatively thin plate-like element hingedly connected adjacent its lower edge for the aforesaid vertical tilting adjustment between said upwardly and outwardly inclined spaced and upwardly inclined contacting relations, said actuating means being connected to the plates in each row adjacent the upper edges thereof for tilting the plates to the aforesaid upwardly and outwardly inclined spaced and the increased inclined contacting closed positions, said plates having their opposite faces highly polished for maximum infrared reflection from said opposite faces.

10. A radiation control system for outer space environments such as in orbit in outer space, on the moon, and on the nearby planets for protecting an occupant therein against excess radiation comprising, a pressure suit, a flexible mail-like enclosure for enclosing the suit composed of upwardly and outwardly inclined vertically spaced adjustable overlapping plate-like members horizontally pivoted adjacent their lower edges in horizontally spaced overlapping rows, means for pivotally supporting said plate-like members in spaced heat insulated relation to the exterior of said suit, and flexible elongated cable tilting means connected to the upper edge portions of the plate-like members in each row for moving the upper edge portions of said plate-like members in each row to a closed upwardly and outwardly inclined overlapping contacting relation, said plate-like members having highly infrared reflective opposite faces for reflecting upwardly and inwardly directed exterior radiation downwardly and outwardly, and outward infrared radiation upwardly and outwardly, when in said upwardly inclined overlapping spaced relation, and reflecting exterior infrared radiation outwardly and downwardly, and reflecting said outward interior infrared radiation back toward the suit when said plates are moved to said overlapping contacting relation.

11. Apparatus as set forth in claim 10, in which said plate-like members are substantially flat disks disposed in vertical and horizontal overlapping relation in upwardly and outwardly inclined vertically spaced relation to each other in vertical rows, and said suspension means including a first cable means in each row connected to the lower edges of the upwardly inclined disks in that row and in two adjacent rows for securing the plates in the adjacent rows together, and constituting pivotal means therefor, and includes an outer second cable means in each row connected to the upper edges of the upwardly inclined disks, and means for moving the second cable means in each row longitudinally relative to the first cable means in that row for farther tilting of said disk-like members to said upwardly inclined closed contacting relation.

References Cited in the file of this patent
UNITED STATES PATENTS
2,595,905   Telkes _________________ May 6, 1962